United States Patent
Wisk et al.

(10) Patent No.: US 9,231,365 B1
(45) Date of Patent: Jan. 5, 2016

(54) DISCRETE RAMAN AMPLIFIER

(71) Applicant: OFS Fitel, LLC, Norcross, GA (US)

(72) Inventors: Patrick W Wisk, Greenbrook, NJ (US);
Man F Yan, Berkeley Heights, NJ (US);
Benyuan Zhu, Princeton, NJ (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 14/302,535

(22) Filed: Jun. 12, 2014

(51) Int. Cl.
*H01S 3/30* (2006.01)
*H01S 3/067* (2006.01)
*G02B 6/02* (2006.01)

(52) U.S. Cl.
CPC ............. *H01S 3/302* (2013.01); *G02B 6/02004* (2013.01); *H01S 3/0677* (2013.01)

(58) Field of Classification Search
CPC .... H01S 3/0677; H01S 3/302; G02B 6/02004
See application file for complete search history.

(56) References Cited

U.S. PATENT DOCUMENTS

| | | | |
|---|---|---|---|
| 6,181,464 B1* | 1/2001 | Kidorf et al. | 359/334 |
| 6,310,716 B1* | 10/2001 | Evans et al. | 359/334 |
| 6,995,900 B2* | 2/2006 | Keaton et al. | 359/341.1 |
| 2002/0135866 A1* | 9/2002 | Sasaoka et al. | 359/334 |
| 2003/0035207 A1* | 2/2003 | Gray et al. | 359/344 |
| 2004/0146260 A1* | 7/2004 | Kalish et al. | 385/127 |
| 2008/0074734 A1* | 3/2008 | Nissov et al. | 359/337 |

* cited by examiner

*Primary Examiner* — Eric Bolda
(74) *Attorney, Agent, or Firm* — Jacobs & Kim LLP (57) ABSTRACT

A discrete Raman amplifier comprises a Raman gain fiber, an input port into the Raman gain fiber for receiving optical signals to be Raman amplified, and an output port out of the Raman gain fiber for emitting Raman-amplified optical signals. A pump light input provides pump light to the Raman gain fiber at a plurality of wavelengths so as to provide Raman amplification over the selected signal wavelength range. Within both the pump light wavelength range and the selected signal wavelength range, the Raman gain fiber has only positive chromatic dispersion, and the Raman gain fiber has a moderate effective area.

21 Claims, 5 Drawing Sheets

| Region | Δn | Inner Radius | Outer Radius |
|---|---|---|---|
| Core | 0.017 | --- | 2.8 μm |
| Trench | ~ 0.004 | 2.8 μm | 5.9 μm |
| Cladding | 0.000 | 5.9 μm | 62.5 μm |

| | | |
|---|---|---|
| Cutoff Wavelength | | 1340 nm |
| Zero Dispersion Wavelength (ZDW) | | 1330 nm |
| Chromatic Dispersion (CD) | @ 1420 nm | 5.4 ps/nm·km |
| | @ 1530 nm | 11.2 ps/nm·km |
| | @ 1550 nm | 12.1 ps/nm·km |
| | @ 1650 nm | 16.1 ps/nm·km |
| Effective Area ($A_{eff}$) | @ 1530 nm | 26.0 µm² |
| | @ 1550 nm | 26.3 µm² |
| | @ 1650 nm | 28.3 µm² |
| Attenuation | @ 1450 nm | 0.495 dB/km |
| | @ 1550 nm | 0.399 dB/km |

FIG. 7

| Pump | Wavelength | Power |
|---|---|---|
| Pump 1 | 1427 nm | 330 mW |
| Pump 2 | 1439 nm | 290 mW |
| Pump 3 | 1452 nm | 80 mW |
| Pump 4 | 1467 nm | 170 mW |
| Pump 5 | 1497 nm | 155 mW |
| Total Pump Power | | 1025 mW |

FIG. 8

DISCRETE RAMAN AMPLIFIER

BACKGROUND OF THE INVENTION

1. Field of the Invention

The present invention relates generally to the field of fiber optical communications, and in particular to Raman amplification systems and techniques.

2. Background Art

Demand for large transmission capacity has been increasing exponentially due to the rapid spread of Internet services. There is thus an ongoing effort in the fiber optical communications industry to find cost-effective ways to meet this demand.

Currently, network operators deploy optical fiber transport systems employing only one of either the C-band (1530-1565 nm) or L-band (1570-1610 nm). Erbium-doped fiber amplifier (EDFA) technology is typically employed to provide loss compensation. The transmission fiber typically used to implement these systems actually has a spectrum window that is wide enough to transmit signals over a wavelength range encompassing both the C-band and L-band (i.e., 1530-1610 nm), without a guard band (i.e., at 1565-1570 nm). Thus, by employing this combined wavelength range, it would be possible to double transmission capacity over an existing transmission line.

A major obstacle, for deploying an optical transport system in C+L band is the lack of a wide-band optical amplifier that covers the wavelengths ranging from 1530 nm to 1610 nm, without any intermediate guard band (i.e., bandless). Discrete broadband Raman amplifiers will be in high demand in optical networks of this type. However, conventional discrete Raman amplifiers (DRA) will degrade the performance of future WDM polarization-division-multiplexed (PDM) phase-modulated coherent systems. In particular, conventional DRA designs fail to address a number of issues, including nonlinear impairments, associated system performance, and efficiency.

SUMMARY OF INVENTION

An aspect of the invention is directed to a discrete Raman amplifier comprising a Raman gain fiber, an input port into the Raman gain fiber for receiving optical signals to be Raman-amplified, and an output port out of the Raman gain fiber for emitting Raman-amplified optical signals. A pump light input provides pump light to the Raman gain fiber at a plurality of wavelengths so as to provide Raman amplification over the selected signal wavelength range. Within both the pump light wavelength range and the selected signal wavelength range, the Raman gain fiber has only positive chromatic dispersion, and the Raman gain fiber has a moderate effective area.

Further aspects of the invention are directed to a Raman gain fiber suitable for use in the described discrete Raman amplifier, and to Raman amplification techniques in accordance with the invention.

DETAILED DESCRIPTION

Aspects of the present invention are directed improved Raman fiber amplification structures and techniques.

There are challenges in providing loss compensation for a wavelength-division-multiplexed (WDM) polarization-division-multiplexed quadrature-phase-shift-keying (PDM-QPSK) system, 100 Gb/s and beyond (or a PDM system with phase-modulated signals, such as a 16-QAM system). It has been demonstrated both experimentally and using simulations that when in-line dispersion compensation is used to provide dispersion management, system performance is worse than that of a system not providing any dispersion management. Thus, it appears that future PDM coherent systems, 100 Gb/s and beyond, will not deploy in-line dispersion compensation, but will require the use of discrete or distributed loss compensation components.

However, for a number of reasons, current discrete Raman amplifiers (DRAs) are unsuitable for use as loss compensation components in the above-described systems. Current DRAs are typically based on a Raman gain fiber comprising a dispersion-compensation fiber (DCF) having negative dispersion. In some current DRAs, a negative-dispersion Raman gain fiber may be combined with a length of a positive-dispersion fiber, which is added into the DRA in order to adjust the overall dispersion slope and dispersion compensation. As discussed above, these negative-dispersion DRA designs will degrade the transmission performance of WDM coherent PDM-QPSK systems and the like.

Further, current DRAs typically employ gain fibers having a small effective area ($A_{eff}$) that is less than 15 $\mu m^2$. In coherent detection systems, linear distortions, including chromatic dispersion (CD) and polarization mode dispersion (PMD), can be compensated by receiver digital-signal-processing (DSP). However, high-level phase-modulated signals in polarization division multiplexing (PDM) coherent systems are more susceptible to fiber nonlinear effects.

Nonlinearities are a major obstacle for DWDM PDM phase-modulated coherent systems. A Raman gain fiber with a small effective area can lead to unwanted nonlinear impairments such as four-wave-mixing (FWM), cross-phase-modulation (XPM) and self-phase-modulation (SPM) in DRA. Hence, a Raman gain fiber with a small effective area will not be suitable to provide desired system performance for future WDM PDM coherent systems at 100 Gb/s and beyond.

Thus, aspects of the present invention are directed to a broadband DRA that comprises a Raman gain fiber with positive chromatic dispersion (CD) and with a moderate effective area ($A_{eff}$). As discussed below, the present invention arose from the insight was that it was possible to achieve a suitable tradeoff between nonlinear impairment and Raman gain efficiency for C+L bandless PDM coherent optical fiber transmission systems, i.e., that was possible to provide an effective area that is sufficiently small so as to provide adequate Raman gain, and at the same time is sufficiently large so as to provide for mitigation of nonlinear impairments in PDM coherent transmission systems.

Exemplary Discrete Raman Amplifier

Figure 1:
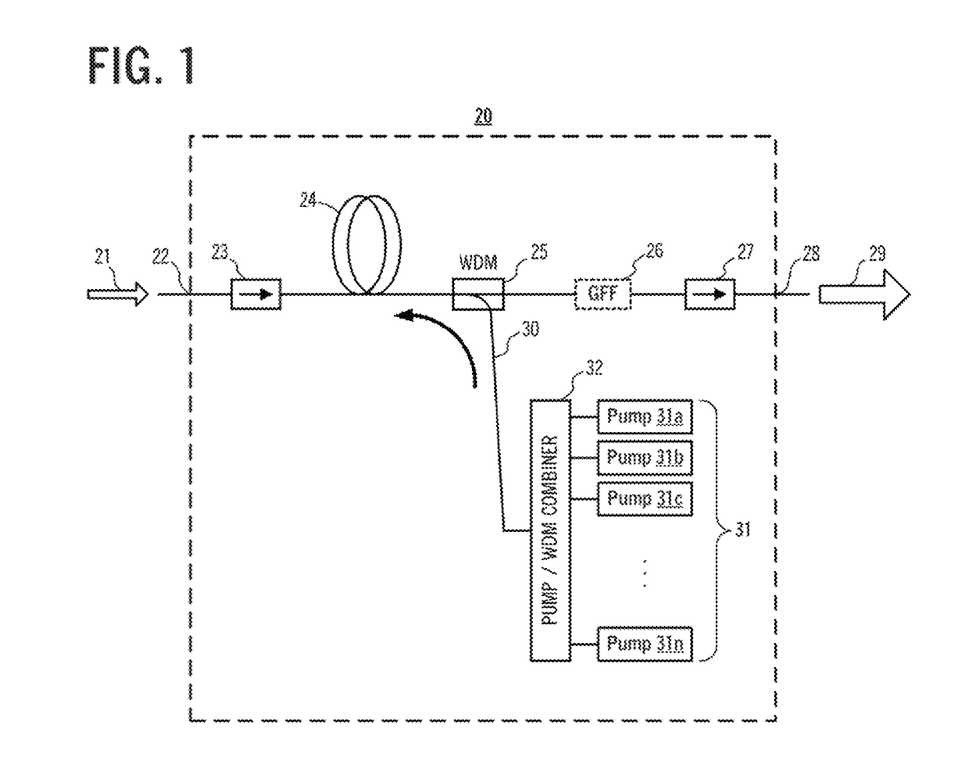
FIG. 1 shows a schematic diagram of a discrete Raman amplifier (DRA) according to an aspect of the invention.

FIG. 1 shows a schematic diagram of a DRA 20, according to an aspect of the invention, that addresses the above issues. DRA 20 comprises an input port 22 connected to the input end of a positive-dispersion Raman gain fiber 24 through a first optical isolator 23. The output end of the Raman gain fiber 24 is connected to an output port 28 through a second optical isolator 27.

A pump light input 30 is coupled to the Raman gain fiber 24 through wavelength-division multiplexer (WDM) coupler 25, which is connected between the output end of the Raman gain fiber 24 and the second optical isolator 27. Pump light input 30 is connected to a pump array 31 comprising a plurality of individual pump light sources 31a-n, which provide pump light at a respective plurality of individual wavelengths. The pump lights at different wavelengths are combined together by a pump WDM combiner 32. Additionally, an optional gain-flattening filter (GFF) 26 is connected between WDM coupler 25 and second optical isolator 27.

In operation, DRA 20 receives a broadband input 21 (e.g., signals ranging from 1530 nm to 1610 nm) at input port 22 and provides a Raman-amplified broadband output 29 at output port 28. Specifically, the broadband input 21 received at input port 22 propagates into the Raman gain fiber 24 through the first optical isolator 23. The pump light input 30 provides pump light into Raman gain fiber 24 via WDM coupler 25 so as to cause Raman amplification over a range of signal wavelengths. The output of the Raman gain fiber 24 then propagates to output port 28 through GFF 26 and second optical isolator 27.

In DRA 20, pump light from pump array 31 is coupled into the Raman gain fiber 24 using a "counter-propagation" configuration (i.e., a configuration in which pump light propagates through the Raman gain fiber in a direction opposite to that of the signal light being amplified).

It is noted that a "co-propagation" configuration (i.e., a configuration in which the pump light propagates through the Raman gain fiber in the same direction as that of the signal light being amplified) may be considered if the relative intensity noise (RIN) of the pump light is low (preferably, RIN<–130 dB/Hz). DRA 20 can be modified to employ a co-propagation configuration, for example, by connecting the WDM coupler 25 and pump light input 30 to the input end of the Raman gain fiber 24 such that pump light from the pump array 31 propagates in the same direction as the signal light from the broadband input 21.

Generally speaking, a counter-propagation configuration is preferable to a co-propagation configuration because a counter-propagation configuration transfers much less relative intensity noise (RIN) from the pump light onto the signals being amplified, resulting in a DRA with a better optical-signal-noise ratio (OSNR). A further reason is that, compared with a co-propagation pump configuration, a counter-propagation pump configuration has a lower path-average power. Thus, the nonlinear impairment effects of discrete Raman amplification are significantly lower.

For the purposes of the present discussion, aspects of the invention are described with respect to the counter-propagation configuration illustrated in FIG. 1. However, it will be appreciated that the structures and techniques described herein below are also applicable in the context of a co-propagation configuration, or with other suitable pumping configurations, including pumping in both co-propagation and counter-propagation directions simultaneously.

DRA 20 is configured to provide amplification over the C+L bands, bandless (i.e., without an intermediate guard band). In other words, DRA 20 provides amplification over the wavelength range 1530-1610 nm, which encompasses both the C-band (1530-1565 nm) and the L-band (1570-1610 nm), without an intermediate guard band (i.e., at 1565-1570 nm).

In an exemplary practice of the invention, pump light input 30 is provided by a pump array 31 comprising five individual pump light sources that provide pump light at the following respective wavelengths: 1427 nm, 1439 nm, 1452 nm, 1467 nm and 1497 nm.

DRA 20 includes at least one optical isolator 23, 27 for preventing optical noise within the designated signal wavelength range (1530-1610 nm) from propagating in a counter-propagation direction. In DRA 20, first and second optical isolators 23 and 27 are integrated, respectively, at the DRA input port 22 and output port 28. Optical isolators 23 and 27 also help to reduce the impairment from multiple-path-interference (MPI) and to avoid reflections. Gain-flattening filter (GFF) 26 is an optional component that can be used for further equalizing (i.e., flattening) gain within the designated signal wavelength range.

The length of the Raman gain fiber 24 is chosen to provide the desired Raman gain for particular applications in a given optical network. Typically, a Raman gain fiber has a length ranging between ~2 km to 7 km. Depending upon a given application, a Raman gain fiber can have a length as short as ~500 m, and as long as 10 km, or even longer.

Raman Gain Fiber Characteristics

In order to increase the walk-off between neighboring channels, and in order to mitigate cross-phase modulation (XPM) in long-haul DWDM PDM-QPSK transmission systems, the Raman gain fiber 24 has a positive chromatic dispersion (CD) that is greater than 5 ps/nm·km at signal wavelength from 1530-1610 nm. Preferably, Raman gain fiber 24 has a positive CD that is greater than ~10 ps/nm-km in signal wavelength range. In addition, a positive dispersion slope is usually also desirable.

In order to avoid pump-pump FWM and pump-signal FWM from the Raman gain fiber 24, it is desirable that the zero-dispersion-wavelength (ZDW) of the Raman gain fiber 24 to be below the range of the pump wavelengths, with some separation between the Raman gain fiber ZDW and the lowest pump wavelength. To provide high Raman gain efficiency for broadband signals in the selected signal wavelength range (i.e., 1530-1610 nm), the pump light wavelengths will range from ~1420 nm to ~1510 nm. Thus, a suitable ZDW for a Raman gain fiber is 1420 nm, or lower.

Also, in order to suppress the FWM effect resulting from high-power pumping over a broad wavelength range, and in order to prevent modulation instability (MI) in DRA 20, Raman gain fiber 24 is configured to have a positive CD greater than ~2 ps/nm·km at a given pump light wavelength range (e.g., 1425-1505 nm), and it is preferable to have CD greater than 5 ps/nm·km at the pump wavelength range.

Raman gain fiber 24 must provide high Raman gain efficiency, while at the same time avoiding nonlinear effects (such as XPM and FWM). Thus, according to an aspect of the invention, Raman gain fiber 24 is configured to have an effective area ($A_{eff}$) larger than ~20 μm² (in order to avoid nonlinear effects), and less than ~40 µm² On order to provide sufficient Raman gain) at wavelength 1550 nm. As used herein, the term "moderate effective area" or "moderate $A_{eff}$" is used to describe an effective area $A_{eff}$ that satisfies these criteria, i.e.: ~20 µm²<$A_{eff}$<~40 µm². A moderate $A_{eff}$ also mitigates multiple-path-interference (MPI) in DRA 20.

It is further desirable for the Raman gain fiber 24 to have low attenuation losses (i.e., <~0.6 dB/km) at both the range of pump light wavelengths (1425-1505 nm) and the range of signal light wavelengths (1530-1610 nm).

A suitable Raman gain fiber can be implemented, for example, as a germanium-doped silica core fiber having a core-to-cladding Δn of at least ~1.5%. The addition of germanium to a silica-based optical fiber increases the Raman scattering coefficient, $G_R$, and thus increases Raman gain efficiency. Suitable Raman gain fibers have core radius of between about ~2.0 µm and ~3.0 µm.

According to an aspect of the invention, the Raman gain fiber includes a plurality of dopants having a distribution that is configured to achieve both a specified Raman gain coefficient and a specified core index.

A higher Ge-dopant concentration in the fiber core increases the Raman gain coefficient $G_R$, but also increases the refractive index. When it is necessary to increase the Ge-dopant concentration in order to achieve a desired Raman gain coefficient $G_R$, it is possible to achieve a desired core index by introducing a suitable amount of an index-lowering co-dopant into the core, such as fluorine (F), boron (B), or a combination of fluorine and boron. Generally speaking, F-dopant is preferred as a co-dopant since it does not increase fiber attenuation significantly. Furthermore, when the fiber is thermally spliced to a transmission fiber, the presence of F-dopant increases dopant diffusivity. This increase in dopant diffusivity in turn causes a lowering of the core index of the Raman gain fiber at the splice joint, resulting in a better mode-field match and therefore a lower splice loss.

Exemplary Raman Gain Fiber

Figure 2:
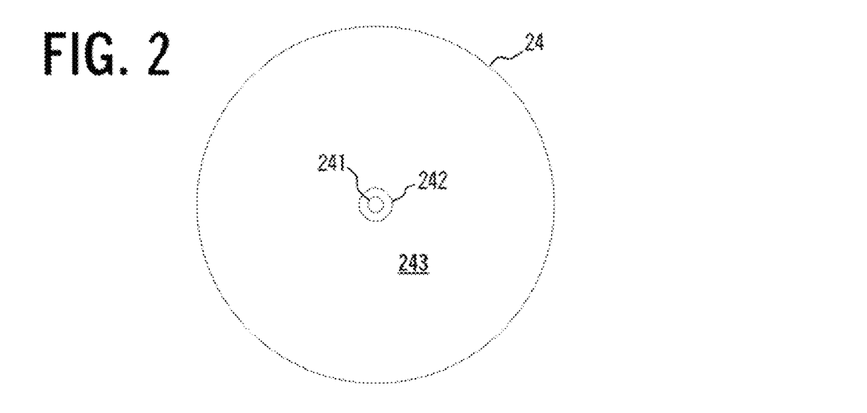
FIG. 2 shows a cross-section view of an exemplary optical Raman gain fiber according to a further aspect of the invention, suitable for use in the DRA shown in FIG. 1.

FIG. 2 shows a cross section view of an exemplary optical Raman gain fiber 24, according to an aspect of the invention, that satisfies the above criteria. Fiber 24 was fabricated using a standard modified chemical vapor deposition (MCVD) technique, and comprises a silica substrate in which a plurality of concentric regions are formed through the use of index-modifying chemical dopants. The fiber regions comprise a raised-index core 241, a depressed-index trench region 242, and an undoped outer cladding region 243.

The physical size of each region is described herein with respect to its inner radius and outer radius:

the core 241 has an outer radius of 2.8 µm;

the trench 242, which surrounds the core 241, has an inner radius of 2.8 µm and an outer radius of 5.9 µm; and the outer cladding 243, which surrounds the trench 242, has an inner radius of 5.9 µm and an outer radius of 62.5 µm.

For the purposes of the present description, the refractive index of each fiber region is described with respect to its refractive index difference Δn, i.e., the difference between the region's refractive index and the refractive index of the outer cladding. By definition, Δn for the outer cladding region 243 is equal to 0.

Figure 3:
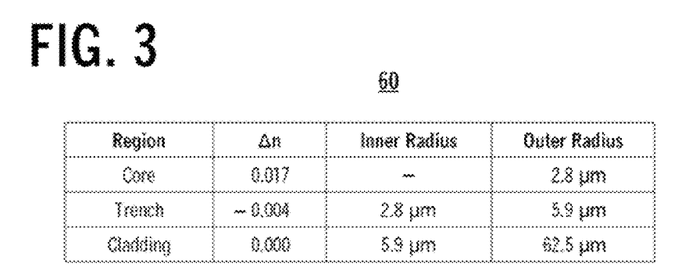
FIG. 3 shows a table setting forth specific values for the inner radius, the outer radius, and the index difference $\Delta n$ for the core, trench, and outer cladding regions of the Raman gain fiber shown in FIG. 2.

FIG. 3 shows a table 60 setting forth specific values for the inner radius, the outer radius, and the index difference Δn for each of the three fiber regions in an exemplary Raman gain fiber according to an aspect of the invention.

Figure 4:
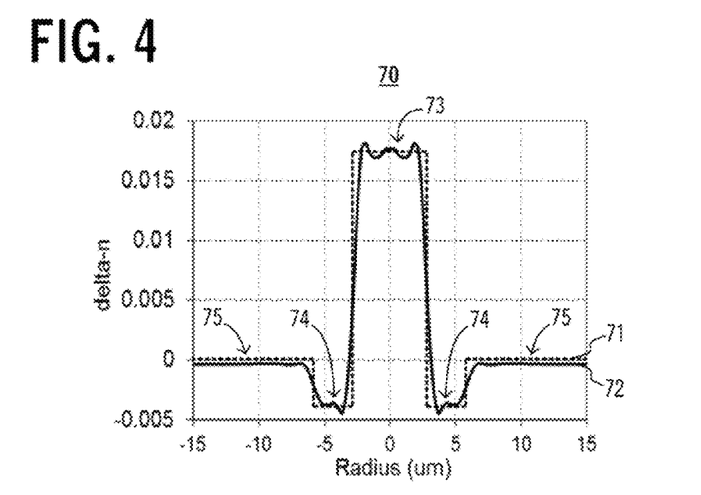
FIG. 4 shows a refractive index profile for the exemplary Raman gain fiber shown in FIG. 2.

FIG. 4 shows the fiber's refractive index profile 70. The plot of the idealized index profile 71 is shown as a broken line. The plot of the actual index profile 72 achieved in the manufactured fiber is shown as a solid line. The central "spike" 73 of the index profile corresponds to the fiber core 241; the two depressed "shoulders" 74 of the index profile correspond to the fiber trench 242; and the flat outer portions 75 of the index profile correspond to the fiber's outer cladding 243.

Figure 5:
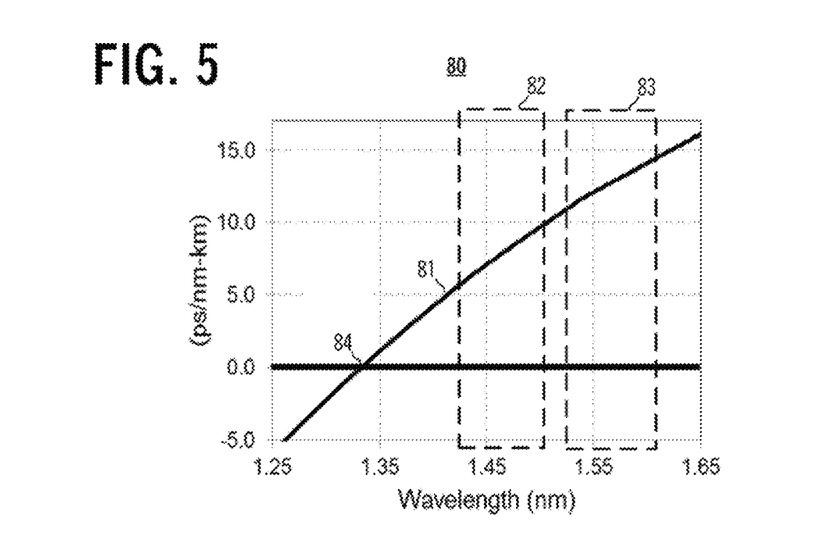
FIG. 5 shows a graph illustrating the relationship between chromatic dispersion and wavelength for the exemplary Raman gain fiber shown in FIG. 2.

FIG. 5 shows a graph 80, in which plot 81 illustrates the relationship between chromatic dispersion (CD) and wavelength for fiber 24. In graph 80, the pump range (1425-1505 nm) and the wavelength range (1530-1610 nm) are shown as boxes 82 and 83. The zero-dispersion wavelength is the intersection between plot 81 and the x-axis.

Figure 6:
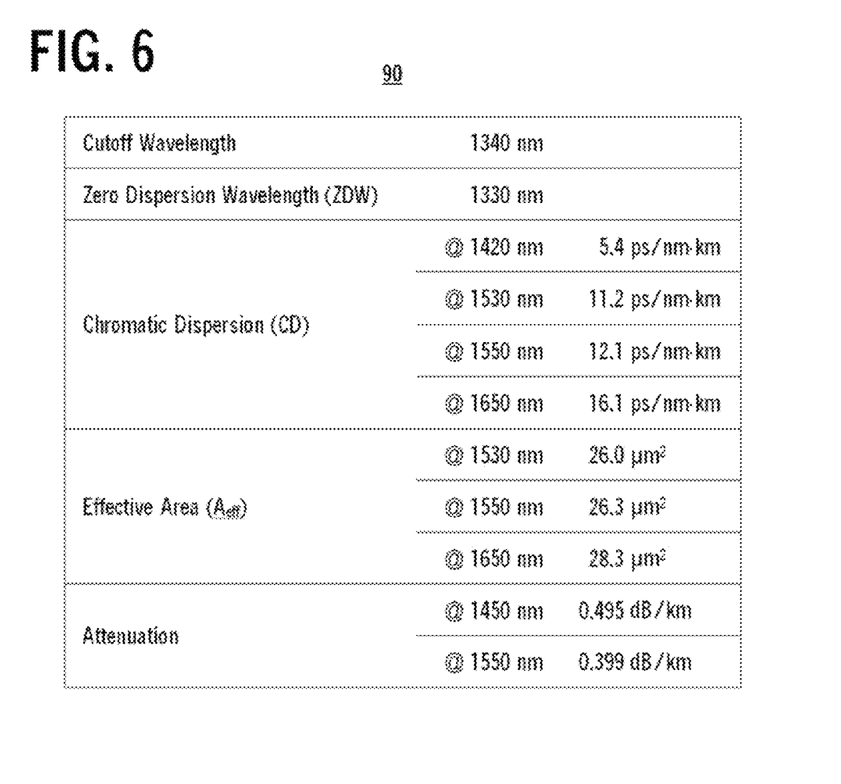
FIG. 6 shows a table setting forth the key parameters for the exemplary Raman gain fiber shown in FIG. 2.

FIG. 6 shows a table 90 setting forth the key parameters for fiber 24, including: cutoff wavelength; zero dispersion wavelength (ZDW); chromatic dispersion (CD); effective area ($A_{eff}$); attenuation.

The use of the trench region 242 in Raman gain fiber 24 pushes the zero-dispersion wavelength (ZDW) and the cutoff wavelength further down, with positive CD at desirable wavelength values in both the pump and signal wavelength ranges (indicated by boxes 82 and 83).

Results

Figure 7:
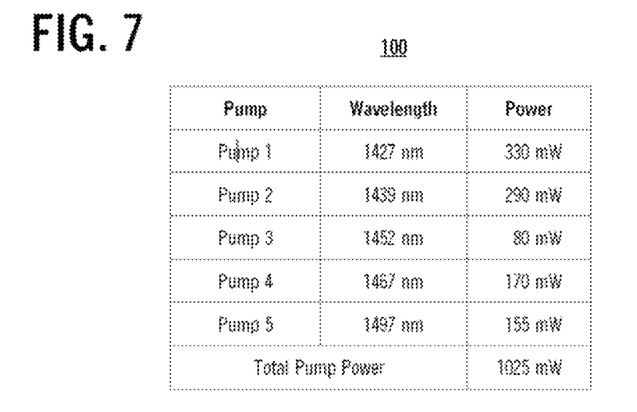
FIG. 7 shows a table setting forth the respective wavelengths and pump power for each pump light source in an exemplary practice of the invention.

A broadband DRA system based on the configuration shown in FIG. 1 was demonstrated using the Raman gain fiber as described above. The DRA was counter-pumped by five depolarized semiconductor lasers at wavelength 1427 nm, 1439 nm, 1452 nm, 1467 nm and 1497 nm, and no GFF was used. FIG. 7 shows a table 100 setting for exemplary pump powers for each of the five pump light sources.

Figure 8:
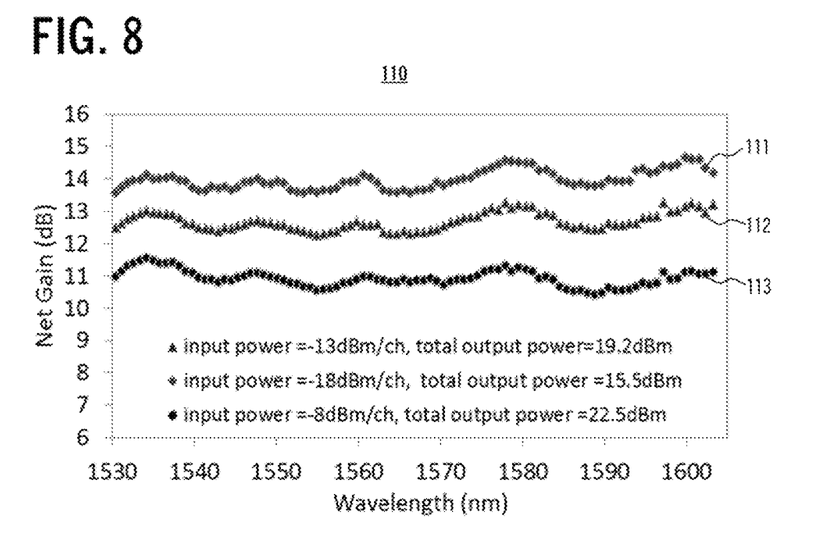
FIG. 8 shows the measured net gain spectrum for an exemplary practice of the invention.

FIG. 8 shows the measured net gain spectrum 110 at wavelength 1530.2-1603.2 nm.

The upper plot 111 (diamonds) shows gain as a function of wavelength where the input power is −18 dBm/channel. The total output power is 15.5 dBm.

The middle plot 112 (triangles) shows gain as a function of wavelength where the input power is −13 dBm/channel. The total output power is 19.2 dBm.

The lower plot 113 (circles) shows gain as a function of wavelength where the input power is −8 dBm/channel. The total output power is 22.5 dBm.

It can be seen that a net average gain in range of 11-14 dB can be obtained from the DRA, depending upon the different input powers. It can further be seen that the gain curves are relatively flat within a 73 nm bandwidth, and even when the DRA is implemented without a GFF 26, and even when implemented using only five pump light sources.

The total output power of the DRA can be as high as 22.5 dBm. This output power with a gain of ~11-14 dB will be good enough for the applications of amplifiers for compensating to loss from a reconfigurable optical add-drop multiplexer (ROADM). Another application for the depicted DRA is for bandless in-line amplifiers in combined with backward-pumped distributed Raman amplifiers for fiber spans used in a terrestrial optical network.

General Technique

Figure 9:
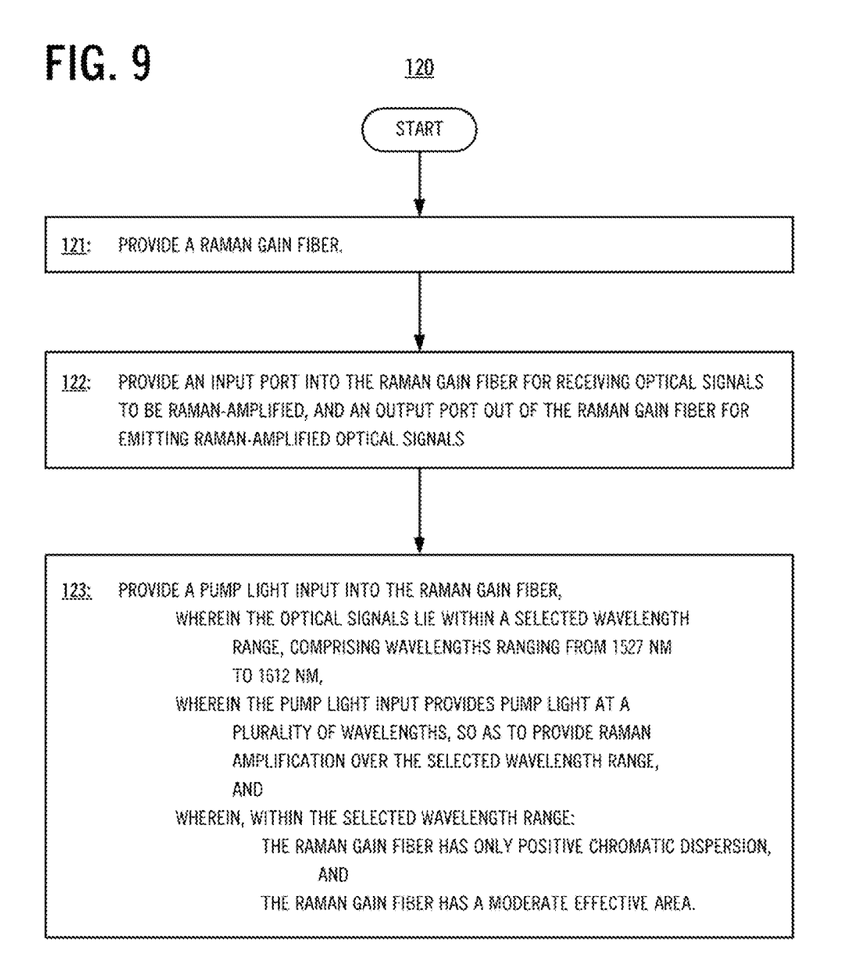
FIG. 9 shows a flowchart illustrating a general technique according to aspect of the invention.

FIG. 9 shows a flowchart illustrating a general technique 120 according to the above-described aspects of the invention, comprising the following steps:

121: Provide a Raman gain fiber.

122: Provide an input port into the Raman gain fiber for receiving optical signals to be Raman-amplified, and an output port out of the Raman gain fiber for emitting Raman-amplified optical signals.

123: Provide a pump light input into the Raman gain fiber, wherein the optical signals lie within a selected wavelength range, comprising wavelengths ranging from 1530 nm to 1610 nm, wherein the pump light input provides pump light at a plurality of wavelengths, so as to provide Raman amplification over the selected wavelength range, and wherein, within the selected wavelength range:
the Raman gain fiber has only positive chromatic dispersion, and
the Raman gain fiber has a moderate effective area.

CONCLUSION

While the foregoing description includes details that will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

What is claimed is:

1. A discrete Raman amplifier, comprising:
a Raman gain fiber;
an input port into the Raman gain fiber for receiving optical signals to be Raman-amplified;
an output port out of the Raman gain fiber for emitting Raman-amplified optical signals; and
a pump light input into the Raman gain fiber,
wherein the optical signals lie within a selected signal wavelength range, comprising wavelengths ranging from 1530 nm to 1610 nm,
wherein the pump light input provides pump light at a plurality of wavelengths, so as to provide Raman amplification over the selected signal wavelength range,
wherein, within the selected signal wavelength range:
the Raman gain fiber has only positive chromatic dispersion, and
the Raman gain fiber has an effective area between 20 $\mu m^2$ and 40 $\mu m^2$ at wavelength 1550 nm.

2. The discrete Raman amplifier of claim 1,
wherein, within the selected signal wavelength range, the chromatic dispersion of the Raman gain fiber is greater than 5 ps/nm·km.

3. The discrete Raman amplifier of claim 1,
wherein, within the selected signal wavelength range, the chromatic dispersion of the Raman gain fiber is greater than 10 ps/nm·km.

4. The discrete Raman amplifier of claim 1,
wherein the Raman gain fiber has a zero-dispersion wavelength that is less than any of the plurality of wavelengths at which pump light is provided.

5. The discrete Raman amplifier of claim 1,
wherein the Raman gain fiber has a positive dispersion slope.

6. The discrete Raman amplifier of claim 1,
wherein the Raman gain fiber includes a plurality of dopants having a distribution that is configured to achieve both a specified Raman gain coefficient and a specified core index, and
wherein the plurality of dopants includes fluorine, boron, or a combination of fluorine and boron.

7. The discrete Raman amplifier of claim 1,
wherein the pump light input provides pump light into the Raman fiber in a counter-propagation direction with respect to the optical signals.

8. The discrete Raman amplifier of claim 1,
wherein the pump light input provides pump light into the Raman fiber in a co-propagation direction with respect to the optical signals.

9. The discrete Raman amplifier of claim 1,
wherein the pump light input provides pump light into the Raman fiber in both co-propagation and counter-propagation directions with respect to the optical signals.

10. The discrete Raman amplifier of claim 1,
wherein the pump light input provides pump light at a plurality of wavelengths over a range comprising 1420 nm to 1510 nm.

11. The discrete Raman amplifier of claim 1,
further comprising optical isolators at the input and output ports.

12. The discrete Raman amplifier of claim 11, further including a gain-flattening filter, connected between the Raman gain fiber and the optical isolator at the output port, for equalizing gain over the selected signal wavelength range.

13. A Raman amplification method, comprising:
(a) providing a Raman gain fiber;
(b) providing an input port into the Raman gain fiber for receiving optical signals to be Raman-amplified, and an output port out of the Raman gain fiber for emitting Raman-amplified optical signals; and
(c) providing a pump light input into the Raman gain fiber,
wherein the optical signals lie within a selected signal wavelength range, comprising wavelengths ranging from 1527 nm to 1610 nm,
wherein the pump light input provides pump light at a plurality of wavelengths, so as to provide Raman amplification over the selected signal wavelength range,
wherein, within the selected signal wavelength range:
the Raman gain fiber has only positive chromatic dispersion, and
the Raman gain fiber has an effective area between 20 $\mu m^2$ and 40 $\mu m^2$ at wavelength 1550 nm.

14. The Raman amplification method of claim 13,
wherein, within the selected signal wavelength range, the chromatic dispersion of the Raman gain fiber is greater than 5 ps/nm·km.

15. The Raman amplification method of claim 13,
wherein, within the selected signal wavelength range, the chromatic dispersion of the Raman gain fiber is greater than 10 ps/nm·km.

16. The Raman amplification method of claim 13,
wherein step (c) comprises configuring the pump light input so as to provide pump light into the Raman fiber in a counter-propagation direction with respect to optical signals being amplified.

17. The Raman amplification method of claim 13,
wherein step (c) comprises configuring the pump light input so as to provide pump light into the Raman fiber in a co-propagation direction with respect to optical signals being amplified.

18. The Raman amplification method of claim 13,
wherein step (c) comprises configuring the pump light input so as to provide pump light into the Raman fiber in both co-propagation and counter-propagation directions with respect to optical signals being amplified.

19. The Raman amplification method of claim 13,
wherein step (c) comprises configuring the pump light input so as to provide pump light at a plurality of wavelengths over a range comprising 1420 nm to 1510 nm.

20. The Raman amplification method of claim 13, further comprising:
providing optical isolators at the input and output ports.

21. The Raman amplification method of claim 20, further comprising:
  connecting a gain-flattening filter between the Raman gain fiber and the optical isolator at the output port, for equalizing gain over the selected signal wavelength range.

* * * * *